(12) United States Patent
Holl et al.

(10) Patent No.: US 6,471,392 B1
(45) Date of Patent: Oct. 29, 2002

(54) METHODS AND APPARATUS FOR MATERIALS PROCESSING

(75) Inventors: Richard A. Holl, Oxnard; Alan N. McGrevy, Camarillo, both of CA (US)

(73) Assignee: Holl Technologies Company, Camarillo, CA (US)

( * ) Notice: Subject to any disclaimer, the term of this patent is extended or adjusted under 35 U.S.C. 154(b) by 13 days.

(21) Appl. No.: 09/802,037

(22) Filed: Mar. 7, 2001

(51) Int. Cl.[7] ................................................. B01F 7/12
(52) U.S. Cl. ...................................................... 366/279
(58) Field of Search ................................ 366/279, 315, 366/342, 343, 348, 349, 165.1; 241/1

(56) References Cited

U.S. PATENT DOCUMENTS

| | | | |
|---|---|---|---|
| 591,494 A | * 10/1897 | Pond | |
| 2,295,740 A | * 9/1942 | Keen | 366/279 |
| 2,314,598 A | * 3/1943 | Phelan | 366/279 |
| 2,577,247 A | * 12/1951 | Irwin | |
| 3,095,349 A | * 6/1963 | Rich | 366/279 |
| 3,595,531 A | * 7/1971 | Williams et al. | 366/279 |
| 3,841,814 A | * 10/1974 | Eckhardt | 366/279 |
| 3,870,082 A | 3/1975 | Holl | |
| 4,071,225 A | 1/1978 | Holl | |
| 4,174,907 A | * 11/1979 | Suh et al. | 366/279 |
| 4,198,383 A | * 4/1980 | Konsetov et al. | 366/279 |
| 4,593,754 A | 6/1986 | Holl | |
| 4,670,103 A | 6/1987 | Holl | |
| 4,784,218 A | 11/1988 | Holl | |
| 5,279,463 A | 1/1994 | Holl | |
| 5,300,019 A | 4/1994 | Bischof et al. | |
| 5,335,992 A | 8/1994 | Holl | |
| 5,370,824 A | * 12/1994 | Nagano et al. | 366/279 |
| 5,538,191 A | * 7/1996 | Holl | 241/1 |
| 5,554,323 A | * 9/1996 | Tsukimi et al. | |
| 5,558,820 A | * 9/1996 | Nagano et al. | |
| 5,674,004 A | * 10/1997 | Takeuchi | 366/279 |

OTHER PUBLICATIONS

US 6,159,264, 12/2000, Holl (withdrawn)
Soohoo, Examiner Tony; PCT International Search Report from application PCT/US02/05361; Jun. 5, 2002.
Van Der Hoeven, Examiner Maria; PCT International Search Report from application PCT/US01/15258; Jan. 2, 2002.

* cited by examiner

Primary Examiner—Tony Glen Soohoo
(74) Attorney, Agent, or Firm—Greenberg Traurig, LLP (57) ABSTRACT

Methods and apparatus for processing materials employ two cylindrical members, one mounted within the other, defining an annular processing chamber. Preferably, the outer member is stationery (stator), while the inner rotates (rotor). The radial spacing between the stator inner surface and the rotor outer surface is equal to or less than the back-to-back radial thicknesses of the two laminar boundary layers formed on the two surfaces by the material being processed. The surfaces are made smooth, as by buffing to a finish of not more than 10 microinches. This structure inhibits formation of Taylor vortices in the processing passage, which cause unstable flow and consequent incomplete mixing. Preferably, the relative velocity between rotor and stator surfaces is at least 1.2 meters per second. The surfaces may be coated with catalysts. Transducers may be provided to apply processing energy, such as microwave, light or ultrasonic waves, through the stator wall.

19 Claims, 5 Drawing Sheets

METHODS AND APPARATUS FOR MATERIALS PROCESSING

FIELD OF THE INVENTION

The invention is concerned with methods and apparatus for materials processing involving a chemical and/or a physical action(s) or reaction(s) of a component or between components. Examples of processes that are encompassed by the invention are heating, cooling, agitation, reaction, dispersion, change of state including solution and emulsification, oxidation, reduction, blending, neutralization, change of shape, of density, of molecular weight, of viscosity or of pH. Other examples that are more specifically chemical reactions are halogenation, nitration, reduction, cyanation, hydrolysis, dehydroxation, epoxidation, ozonation diazotisation, alkylation, esterification, condensation, Mannich and Friedel-Crafts reactions and polymerization.

REVIEW OF THE PRIOR ART

Apparatus for materials processing consisting of coaxial cylinders that are rotated relative to one another about a common axis, the materials to be processed being fed into the annular space between the cylinders, are known. For example, U.S. Pat. No. 5,370,999, issued Dec. 6, 1994 to Colorado State University Research Foundation discloses processes for the high shear processing of a fibrous biomass by injecting a slurry thereof into a turbulent Couette flow created in a "high-frequency rotor-stator device", this device having an annular chamber containing a fixed stator equipped with a coaxial toothed ring cooperating with an opposed coaxial toothed ring coupled to the rotor. U.S. Pat. No. 5,430,891, issued Aug. 23, 1994 to Nippon Paint Co., Ltd. discloses processes for continuous emulsion polymerization in which a solution containing the polymerizable material is fed to the annular space between coaxial relatively rotatable cylinders under conditions such that Taylor vortices are formed, whereby a desired complete mixing condition is obtained.

My U.S. Pat. Nos. 5,279,463 (issued Jan 18, 1994) and 5,538,191 (issued Jul. 23, 1996) disclose methods and apparatus for high-shear material treatment, one type of the apparatus consisting of a rotor rotating within a stator to provide an annular flow passage comprising a flow path containing a high-shear treatment zone in which the passage spacing is smaller than in the remainder of the zone to provide a subsidiary higher-shear treatment zone in which free supra-Kolmogoroff eddies are suppressed during passage of the material therethrough.

Couette developed an apparatus for measuring the viscosity of a liquid consisting of a cylinder immersed in the liquid contained in a rotating cylindrical vessel, the viscosity being measured by measuring the torque that was thus applied to the cylinder. It was found that a linear relationship was obtained between the viscosity measurement and the angular velocity of the rotor surface up to a certain value beyond which the linear relationship broke down. This phenomenon was investigated by G. I. Taylor who showed that when a certain Reynolds number was exceeded the previously stratified flow in the annulus between the two cylindrical surfaces became unstable and vortices appeared, now known as Taylor vortices, whose axes are located along the circumference of the rotor parallel to its axis of rotation and which rotate in alternately opposite directions. The conditions for the flow to be become unstable in this manner can be expressed with the aid of a characteristic number known as the Taylor number, depending upon the radial width of the annular gap, the radius of the rotor and its peripheral velocity. Although for their special purpose Nippon Paint wishes Taylor vortices to be present, I have found that when using such apparatus for the types of process given above as examples, especially where thorough and uniform micro-mixing is required, the presence of the vortices inhibits the action or reaction desired since the material to be treated becomes entrained in the vortices and becomes partially segregated in the vortices whereupon mixing becomes incomplete and must be relied upon by much slower diffusion processes.

SUMMARY OF THE INVENTION

It is a principal object of the invention to provide new methods and apparatus for materials processing wherein such methods can be carried out, and the apparatus employed can be operated, without the presence of Taylor vortices so as to facilitate any mixing that is required.

It is a more specific object to provide such methods, and to provide apparatus for carrying out the methods, in which flow of the materials involved can be effected without the generation of Taylor vortices with their consequent inhibition of mixing.

In accordance with the present invention there is provided a new method for processing materials comprising passing the material to be processed in a flow path through an annular processing passage between two closely spaced smooth surfaces provided by respective cylindrical apparatus members rotating relative to one another;

wherein the radial spacing between the two surfaces is equal to or less than the back-to-back radial thicknesses of the two boundary layers of the material against the two surfaces; and wherein the smoothness of the surfaces is such that formation of Taylor vortices in the processing passage is inhibited.

Also in accordance with the invention there is provided new apparatus for processing materials comprising two cylindrical apparatus members mounted for rotation relative to one another, and providing two closely spaced smooth surfaces providing an annular processing passage constituting a flow path for the material;

wherein the radial spacing between the two surfaces is equal to or less than the back-to-back radial thicknesses of the two boundary layers of the material against the two surfaces that is to pass in the processing passage; and wherein the smoothness of the surfaces is such that formation of Taylor vortices in the processing passage is inhibited.

The cylindrical apparatus members may be mounted for rotation about a common axis, or may be mounted for rotation about respective axes so that the members rotate eccentrically and the required spacing is confined to respective sectors of the surfaces. The foregoing, as well as other objects, features and advantages of the invention will be apparent from the following description taken in connection with the accompanying drawings.

DESCRIPTION OF THE DRAWINGS

Particular preferred embodiments of the invention will now be described, by way of example, with reference to the accompanying diagrammatic drawings, wherein.

Similar or equivalent parts are given the same reference number in all of the figures of the drawings, wherever convenient. The spacings between certain surfaces are exaggerated for clarity of illustration.

DESCRIPTION OF THE PREFERRED EMBODIMENTS

Figure 1:
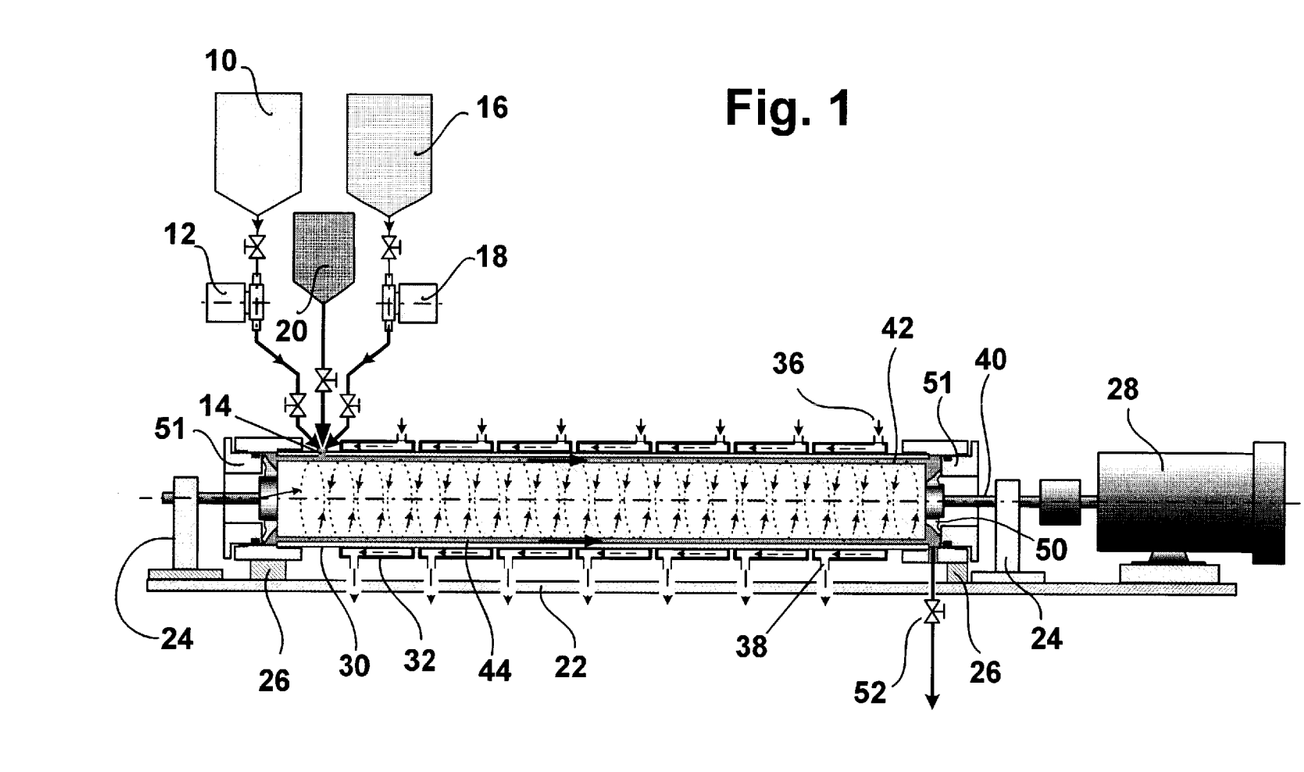
FIG. 1 is a part elevation, part longitudinal cross section through a complete material processing system.

In the system illustrated by FIG. 1, a first reactant (Reactant A) is fed from a supply tank 10 via a metering pump 12 to inlet 14, while a second reactant (Reactant B)is fed from a supply tank 16 via a metering pump 18 to the same inlet 14. If required, an optional catalyst or reactant gas is fed from a supply tank 20 to the inlet 14. If separate inlets 14 are used then they must be in close tangential proximity to one another. The processing apparatus comprises a baseplate 22 on which is mounted rotor bearing supports 24, stator supports 26 and a variable speed electric drive motor 28. A cylindrical tube 30 comprising the apparatus stator is mounted on supports 24, and in turn supports along the major portion of its length another cylindrical tube 32 constituting the outer casing of a heat exchanger through which gas or liquid can be passed to control the temperature in the processing chamber. The annular passage 34 between the cylinders 30 and 32 can be filled with a suitable heat exchange medium such as wire mesh or the special heat exchange structures that are known by the trademark "SphereMatrix", the coolant (or heating fluid if appropriate) entering through inlets 36 and discharging through exits 38. A rotor shaft 40 extends between the supports 24 and is supported thereby, one end of the shaft being connected to the motor 28. The shaft carries a cylindrical rotor 42, which in this embodiment is solid and has its axis of rotation coincident with the longitudinal axis of the stator cylinder 30. An annular cross section processing chamber 44 is formed between the inner cylindrical surface 46 of stator 30 and outer cylindrical surface 46 of rotor 42 and face body 51; the ends of the chamber are closed against leakage by end seals 50 that surround the shaft 40. The reacted material is discharged through an outlet 52.

As the material being processed flows in the processing passage 44 a respective boundary layer forms on each of the cylindrical surfaces 46 and 48, the thickness of which is determined by the viscosity and other factors of the material being processed and the relative flow velocity of the material over the surface. The laminar boundary layer for a fluid flowing over a flat surface along a path length x, which in the invention is taken as one circumferential flow length around the rotor surface, may be determined by the equation:

$$\delta = \frac{4.91 \cdot x}{\sqrt{N_{Rx}}}$$

where $N_{Rx}$ is the product of length x and the flow velocity divided by the kinematic viscosity.

In an example, if we take the rotor circumference as x=0.2394 m, rotations per minute 2,000 and the kinematic viscosity 0.000001 m²/s, we obtain for the thickness of a single laminar boundary δ=0.85 mm and that of a back-to-back laminar boundary layer, 2δ=1.7 mm.

Figure 5:
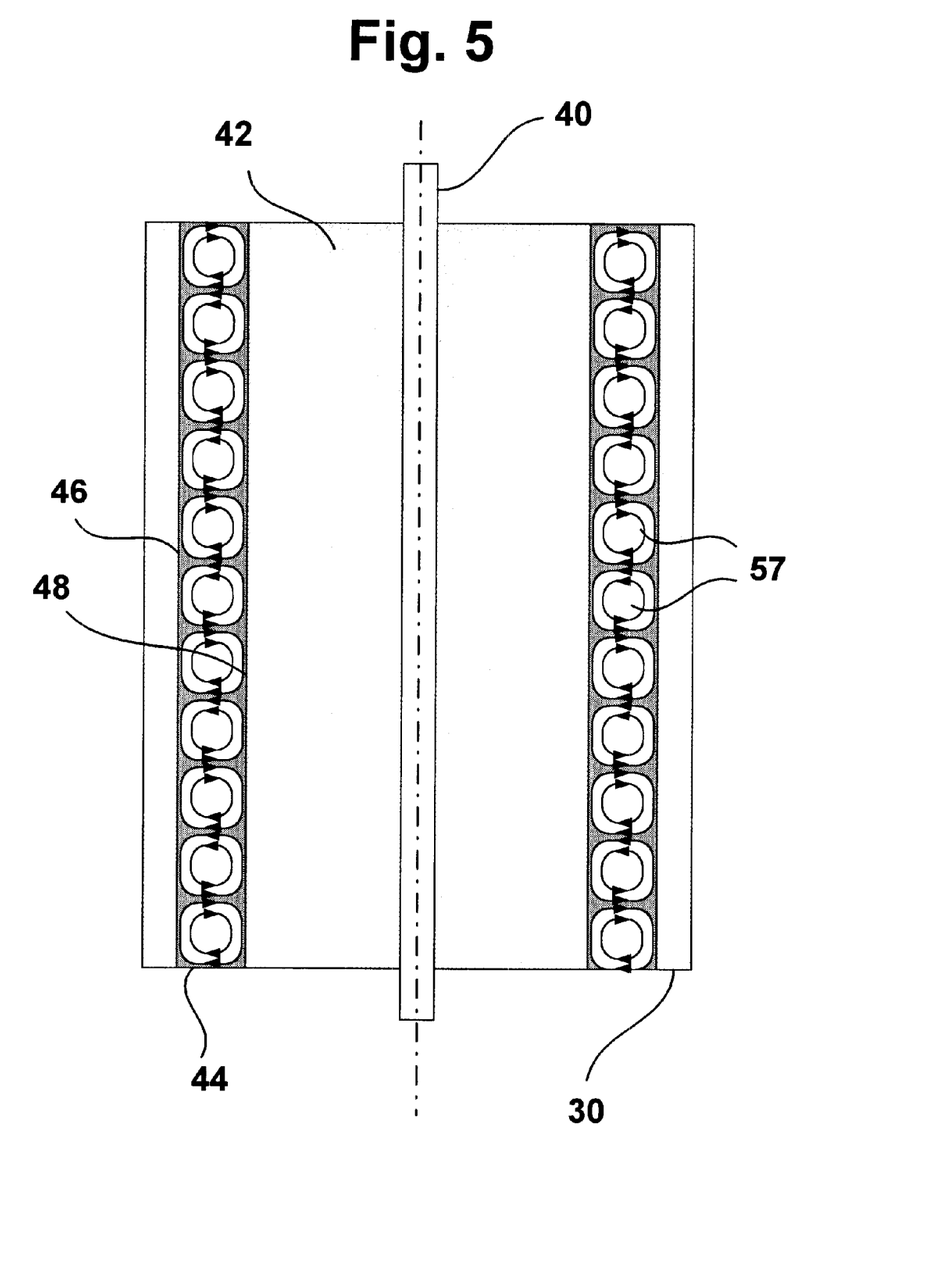
FIG. 5 is a longitudinal cross section through an apparatus to show the formation of Taylor vortices in the annular passage when conditions are appropriate for such formation.

The internal diameter of the stator surface 46 and the external diameter of the rotor surface 48 are such that the radial dimension of the processing passage 44 is approximately equal to the combined thicknesses of the two laminar boundary layers back-to-back, so that there is no room between them for an intervening bulk layer to turn turbulent and would permit Taylor vortices to be formed and disrupt the thorough and uniform micro-mixing that takes place with the material in the two contacting boundary layers. Thus, as explained above, the Taylor vortices 57 when they form are as shown graphically in FIG. 5 and are capable of keeping the different components to be mixed in a partially segregated state in the material to be processed, so that its opportunity for mixing and especially micro-mixing is largely or even completely inhibited, necessitating the very much slower molecular diffusion process to complete the desired reactions. In the above specific example, with an apparatus in which the rotor 42 was of 0.0762 m s external diameter 48, a gap of 1.7 mm in processing passage 44 is required to ensure the absence of any bulk layer between the boundary layers. If the gap is increased to as little as 5 mm, the resulting intervening bulk layer clearly shows strong Taylor instability (as in vortices 57) with the result that the different streams from supply containers 10, 16 and 20, depicted in FIGS. 1 and 2 in different shades, which mix nearly instantaneously with the smaller gap of the invention, do not uniformly mix, to an unacceptable extent, when the gap is increased, as depicted in processing passage 44 as vortices 57 in different colored striations along the flow in the processing passage 44.

Measurements by J. Kaye and E. C. Edgar, as reported in "Modes of adiabatic diabatic fluid flow in an annulus with inner rotating cylinder." Trans. ASME 80, 753–765 (1958), show that there are four main possibilities for flow in an annular passage between two cylindrical relatively rotating surfaces. If both the Reynolds and Taylor numbers are low, e.g. less than about 1,700 for the Reynolds number and 41.3 for the Taylor, the flow will be laminar and streamline. With low to moderate Reynolds number, and Taylor number between 41.3 and 300 the flow is still laminar, but with a system of Taylor vortices. With large values of the Taylor number above 150 and higher Reynolds number the flow is turbulent with vortices, but is still relatively "orderly". With a moderate Taylor number below 150 and a large Reynolds number above 100 the flow is now fully turbulent. The values at which Taylor instability is obtained are however somewhat inconsistent, as is shown by an equivalent set of figures developed by F. Schultz-Grunow and H. Hein, as reported in "Boundary-layer Theory" by Dr. Hermann Schlichting, published by McGraw Hill, Inc. They showed that with a Reynolds number of 94.5 and a Taylor number of 41.3 the flow was laminar, but with the onset of vortex formation. With Reynolds numbers of 322 and 868 and corresponding Taylor numbers of 141 and 387 the flow was still laminar but with clearly defined vortices. With a Reynolds number of 3960 and Taylor number of 1715 the vortex flow was highly turbulent. Unfortunately, the above authors did not indicate the finishing condition of the respective stator and rotor surfaces. Therefore, the above observations are inconclusive and cannot be used as a basis for determining the conditions necessary for achieving micro- and macro-mixing through elimination of Taylor vortices.

Although in the embodiment so far described the central body is the rotor 42, and this is mechanically the most convenient construction, theoretically it is also possible to rotate the exterior cylindrical member, or both the central and exterior members. It has been found essential to rotate the rotor, or to produce between the rotor and the stator a minimum peripheral velocity, in order to maintain the boundary layers. In the presently depicted preferred embodiment, this differential, tangential velocity should not be less than 1.2 meters per second, preferentially above 2.0 m per second. It also has been found unexpectedly that the smoothness of the surfaces 46 and 48 is a critical factor in preventing the formation of Taylor vortices with their consequent instability and capability to keep mixing components segregated. The normal machining of the cylindrical surfaces to the tolerances required for the parameters indicated above (e.g. a radial gap of 1–1½ mm for a rotor 7.5 cm diameter) is insufficient and the resultant roughness of the surface, although not normally regarded as "roughness" is still sufficient for Taylor vortices to be produced. For the presently preferred embodiment, it was found necessary therefore to take the further unexpected step of polishing these surfaces to a so-called mirror finish, or better. The only explanation that can be presented at this time, although I do not intend to be bound by it, is that the imperfections in surface smoothness produced by normal machining, although of high quality, is sufficient to cause the onset of instability, which manifests itself as Taylor vortices. The standard finish of about 40 microinches is too coarse, and a honed finish better than 5 microinches is found to avoid the formation of any flow instability; it is believed at this time that an upper limit of 10 microinches is required if Taylor instability is to be avoided. However, these numbers are subject to modification depending on the physical factors involved.

Figure 2:
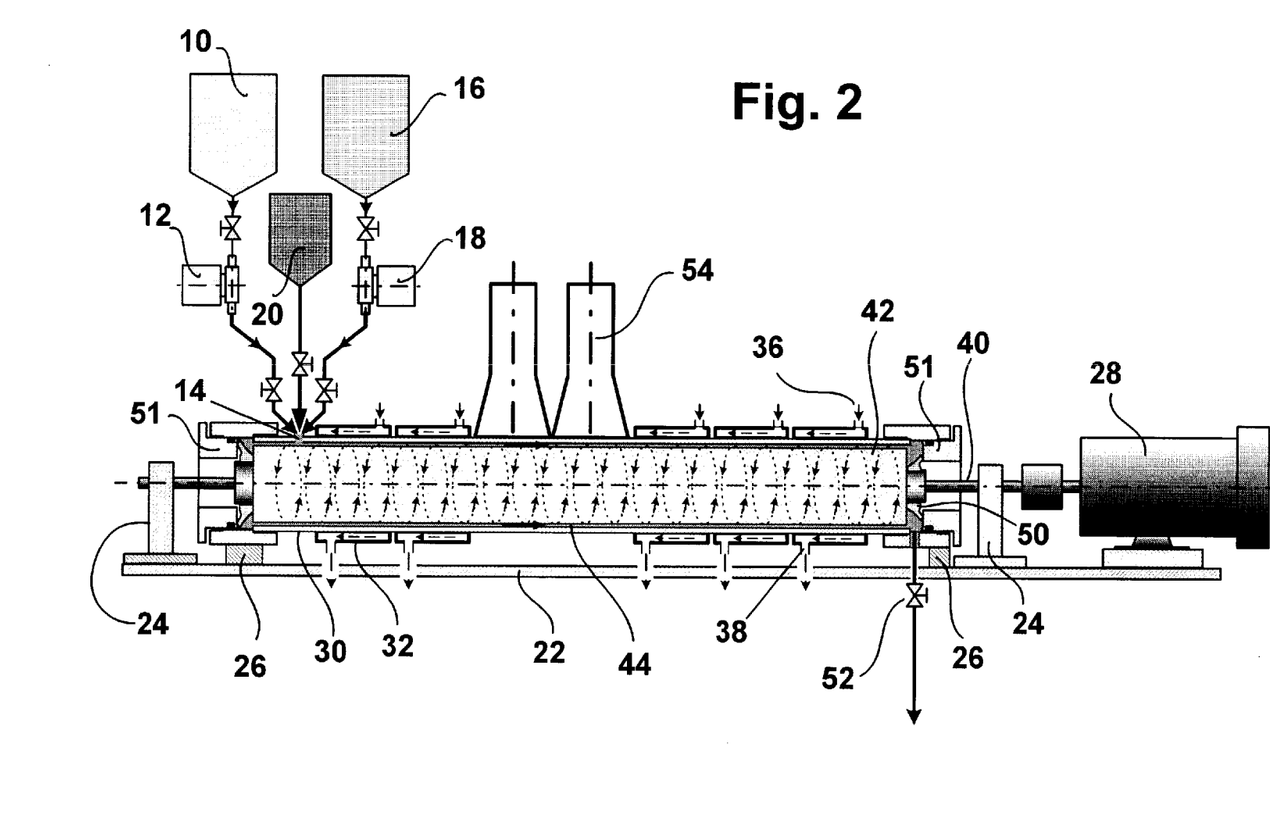
FIG. 2 is a similar part elevation, part longitudinal cross section through another complete material processing system in which external energy can be applied to the system to enhance and/or facilitate the processing.

The embodiment of FIG. 2 is similar to that of FIG. 1. Here, a number of transducers 54 are provided along the length of the rotor 30, and the material from which the rotor is made, or at least the portion thereof between the transducers and the rotor, is as transparent as possible to the energy which is emitted by the transducers. In the drawing, the transducers are indicated as being magnetrons or klystrons, which of course produce very short wavelength (e.g. 2 mm–50 cm) electromagnetic radiation. Another choice is that they can be light sources of whatever wavelength (color) is appropriate for the process, X-ray sources, gamma ray sources, or they can be transducers producing longitudinal oscillations, usually of ultrasonic frequencies.

Figure 3:
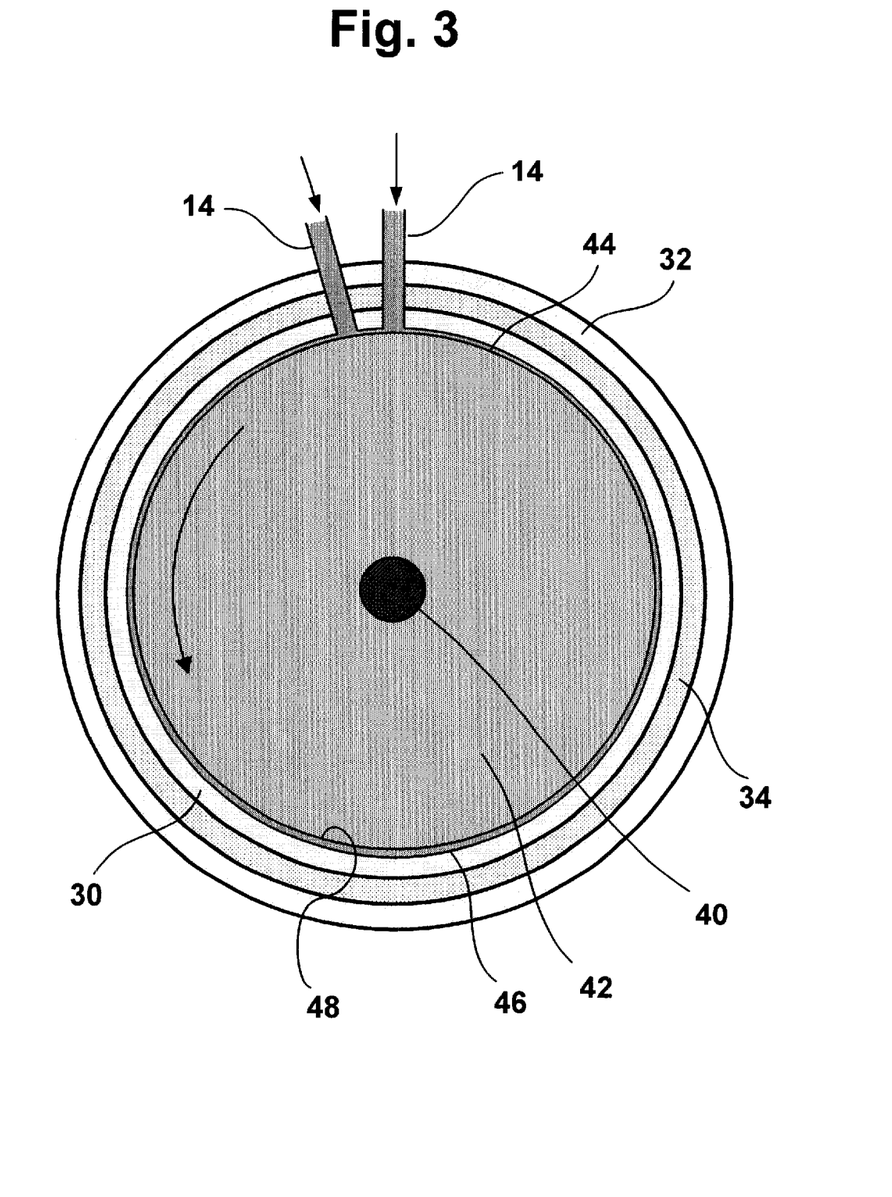
FIG. 3 is a transverse cross section through processing apparatus as shown in FIGS. 1 and 2 to show the cylindrical members and their relation to one another and in which the cooperating surfaces may be coated with catalyst to enhance and/or facilitate the process.
Figure 4:
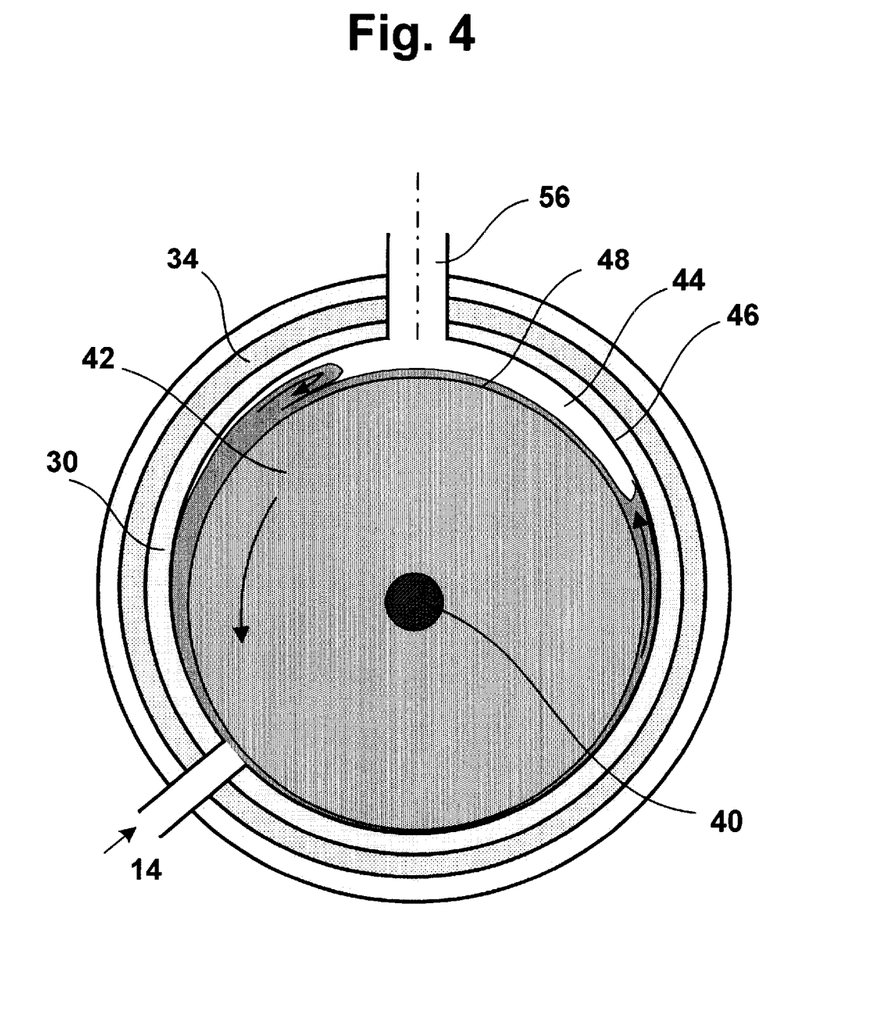
FIG. 4 is a cross section similar to FIG. 3 though apparatus in which the longitudinal axes of the stator and rotor are displaced to give an annular passage that varies in radial width around its circumference.

FIG. 3 represents a cross section through the stator and rotor assembly of FIG. 1. If the cooperating surfaces 46 and 48 in FIG. 3 are coated with a catalyst to facilitate a chemical reaction that constitutes the processing step. The coatings applied must still meet the criteria of the invention as to smoothness in order to obtain the superior mixing that results. The embodiment of FIG. 4 is intended for a fermentation process, and the axis of rotation of the rotor 42 is no longer coincident with the corresponding longitudinal axis of the stator 30, so that the radial processing chamber gap 44 differs in dimension circumferentially around the rotor. A heat exchange structure is provided having an outer casing 32 and heat exchange material 34, since such processes usually are exothermic and surplus heat must be removed for optimum operative conditions for the microorganisms. A series of oxygen feed inlets 14 are arranged along the length of the stator and the oxygen fed therein is promptly emulsified into the broth, providing uniformly dispersed, micronfine bubbles instead of being sparged therein with mm size bubbles of non-uniform distribution, as with conventional fermentation systems. The carbon dioxide that is produced is vented from the upper part of the processing passage through a vent 56. The fermentor according to FIG. 4 is designed to operate continuously and provides a continuous and uniform $CO_2$ removal along the upper portion of the rotor which is constantly wetted with a film of broth of uniform mixedness of all ingredients.

The apparatus of the invention is generically a reactor, and a reactor consists of the vessels used to produce desired products by physical or chemical means, and is frequently the heart of a commercial processing plant. Its configurations, operating characteristics, and underlying engineering principles constitute reactor technology. Besides stoichiometry and kinetics, reactor technology includes requirements for introducing and removing reactants and products, supplying and withdrawing heat, accommodating phase changes and material transfers, assuring efficient contacting among reactants, and providing for catalyst replenishment or regeneration. These issues are taken into account when one translates reaction kinetics and bench-scale data into the design and manufacture of effective pilot plants, and thereafter scale up such plants to larger sized units, and ultimately designs and operates commercial plants.

Commercial Reactor Design and Use

Most reactors have evolved from concentrated efforts focused on one type of reactor. A few processes have emerged from parallel developments using markedly different reactor types. In most cases, the reactor selected for laboratory study has become the reactor type used commercially. Further developments usually will favor extending this technology. Descriptions of some industrially important petrochemical processes and their reactors are available in several recent texts. The following are illustrative examples of reactor usages, classified according to reactor type.

Batch Reactors. The batch reactor is the preferred configuration for manufacturing plastic resins. Such reactors generally are 6–40-$m^3$ (ca 200–1400-$ft^3$), baffled tanks, in which mixing blades or impellers are provided driven from above by long motor shafts. Heat is transferred to and from the contents either through jacketed walls or by internal coils. Finger-shaped baffles near the top are used instead of full-length baffles. All resins, including polyesters, phenolics, alkyds, urea-formaldehydes, acrylics, and furans, can be produced in essentially the same way. Raw materials are held at temperatures of up to 275° C. for e.g. about 12 hours, until the polymerized liquid becomes sufficiently viscous. One plant has been designed to produce 200 different types and grades of synthetic resins in three 18-$m^3$ (ca 640-$ft^3$) reactors. The cost savings of large-scale operations are possible for batch polymerizations. Worldwide production capacity of polyvinylchloride (PVC) is greater than 15×$10^6$ t/yr, but no continuous process reactor has as yet been developed for PVC production. However, commercial batch suspension-type PVC polymerization reactors of 200-$m^3$ (ca 7060-$ft^3$) volume, 5.5-m diameter, and 10-m high have been developed.

Some examples of reaction processes that can be employed in implementation of the present invention are those involving organometallic chemistry; reactions in liquid ammonia; halogenations; nitration; Friedel Craft reactions; reductions; high temperature reactions (up to 260C); cyanation reactions; hydrolysis; dehydrations; epoxidations; diazotisation; alkylations; esterification; condensation reactions; Mannich reactions; and benzene chemistry A paper by G. I. Taylor in 1923 entitled "Stability of a viscous liquid contained between two rotating cylinders" was the first to make a direct comparison between a laboratory experiment and a prediction for the formation of a pattern of instability as encountered in practice. Taylor's analysis of flow between concentric cylinders yielded a well-defined critical value of a dimensionless control parameter, now called the "Taylor number", at which the base flow becomes unstable to small disturbances, resulting in "Taylor vortices" that encircle the inner cylinder and are stacked in the axial direction. Taylor conducted careful experiments that agreed with his theory within a few percent for a wide range of parameters, thus demonstrating that linear stability analyses can make quantitative predictions of patterns. Other pattern formation phenomena to which Taylor made pioneering contributions include: Taylor columns in rapidly rotating fluids (which by the Taylor-Proudman theorem are two-dimensional); the Rayleigh-Taylor instability of an interface between two fluids that is accelerating in the direction of the denser fluid; the Saffman-Taylor fingering instability of a fluid interface that is advancing towards the more viscous fluid; and gas bubbles in a fluid with an electric field. The enormous influence of Taylor's contributions to the understanding of patterns is now well established in these fields.

As stated above, the application of the invention to processes in general is to heat, cool, agitate, react, change state, oxidize, reduce, blend, neutralize, change shape, change density, change molecular weight, disperse, change viscosity, change pH, or alter any property of a substance in a vessel, and such processes may be designated as chemical reactor technology. It is a constant endeavor to provide new technology that can give more efficient production of products. For example, heating and cooling cycle improvements can reduce production times, whether running continuous or batch processes. The materials of construction and approaches to fabrication have changed and contribute significantly to understanding state of the art reactor design and technology. The invention is concerned especially, but not exclusively, with processes and apparatus that modify materials or compounds in solution or suspension through the action of mixing and/or a chemical reaction whose rate can be controlled by the introduction or removal of energy in the form of heat, visible, ultraviolet, or infrared light as well as longitudinal pressure oscillations, microwave, X-ray and gamma irradiations.

Many chemical reaction processes involving liquid/liquid, liquid/solid, liquid/gas or liquid/solid/gas mixing suffer from the persistent problems of non-uniformity of temperature distribution, non-uniformity of distribution of reactants, and creation of unwanted side products due to said non-uniformities. Such chemical reaction processes typically involve crystallization, precipitation, emulsion polymerization, metallocene catalyzed polymerization, enzyme reactions, and sol-gel production. Such problems of non-uniformity prevail in stirred tank reactors, tubular reactors, gas-liquid contactors, etc. A further problem with the above reactor processes is that they are batch processes and require considerable time to be scaled up from bench top testing to commercial production, which can take anywhere from 2 to 5 years, and consequently are associated with considerable cost and the risk of having missed a market opportunity which prevailed at the time when the first experiments started, but may have disappeared after the passing of many years of scaling up the new process.

A specific examples of an application of the invention is the so-called sol-gel process. This approach begins with suitable molecular starting materials, which are simply mixed in solution. Polymerization reactions taking place between the precursors then lead to a solid matrix. For instance, metal alkoxides can be transformed into oxides through hydrolysis and condensation. These materials are increasingly important, technologically finding themselves as components of electric battery cathodes for use in electric cars, heart pacemakers and personal stereos and the like, as well as certain types of sensor devices. One of the main current uses, though, is in improving the optical properties of glass windows by providing an antireflective deposited coating thereon of deposited $SiO_2$—$TiO_2$. There are several advantages to this approach that have led to its increasingly successful application in materials science. The most fundamental is that it is economical in energy as compared with standard solid-state synthetic methods. Refractory oxide materials can be produced relatively easily at fairly low temperatures. It also has the added benefit of allowing a solid to be synthesized from solutions rather than requiring inconvenient and time-consuming powder reactions. Both glasses and ceramics can thus be produced directly from solution. In addition, because the approach involves solutions, industrial scientists have been able to develop applications that exploit this to allow them to coat other materials with functional films that are thermally stable even above 400 C, despite their molecular origins. It is ideal for preparing hybrid materials containing both organic and inorganic species. Such composites find themselves in a category between glasses and polymers and have some intriguing properties. A few have already found commercial application. The main properties of hybrids are for "sol-gel optics". They can, for example, be used to trap organic dyes in sol-gel silica to improve the optical properties of the dyes for applications in lasers, non-linear optical devices, and for photochromic applications. The sol-gel approach is opening up new vistas to synthesis allowing products with combined properties to be prepared as never before. Corriu and his colleagues have reported the preparation of mixed ceramics, such as interpenetrating networks of silicon carbide. Stanley Whittingham, a scientist with the State University of New York at Binghamton, and his team have prepared oxide ceramics from water solutions (hydrothermal processing) at temperatures (100–300° C.) usually the preserve of conventional synthesis rather than solid-state chemistry, so highlighting once again the advantage of a softer approach.

Sol-Gel methods can also be used at the border with biology, where enzymes and living cells can be trapped inside a material such as sol-gel silica and held in a bioactive state. The immediate applications for any technology that can support an enzyme or living cell are likely to be in biosensors and bioreactors, where the material helps provides a protective or supportive environment for the active component, be it enzyme, living cell or other species. The first commercial applications of biogels are in the encapsulation of lipases (enzymes) by Fluka for creating bioreactors in which product profiles can be carefully controlled. Biosensors based on glucose oxidase trapped within sol-gel silica have also been demonstrated, but have not yet been commercialized.

The invention is able to solve the above problems by providing a continuous method of passing the reactants, one of which is a liquid, through a temperature and pressure controlled reactor, in which a subsidiary higher-shear treatment zone 44 between the closely spaced passage surfaces encompasses the entire annular space provided between the rotor 42 and stator 30 surfaces. It is also able to remove scale up problems. Further, it is able to provide exceptional temperature control through back-to-back boundary layer flow combined with adiabatic rotor performance employing thin-walled tubes. Enhanced thermal control is obtainable through exceptionally high U-values with balanced heat transfer resistances, this being achieved through balanced boundary layer thickness control and applying SphereMatrix (Trade mark) enhanced cooling at the outer surface of the stator and back-to-back boundary layer high shear flow at the inner surface of the stator. Further, it can provide enhanced gas liquid reaction through emulsification of gas in back-to-back boundary layer flow. The state of the art processes use stirred tank reactors, impingement reactors, in-line "static mixer" reactors, etc., as described in detail above, all suffer from non-uniform mixing of the reactants and non-uniform adding and removing of heat.

Surprisingly, and in contrast with the situation that arises with large gap sizes that allow a bulk layer to exist between the boundary layers, a near instantaneous uniform and constant mixing is obtained with the methods and apparatus of the invention, beginning at the point of entry of the admixed component, this being-achieved when the annular gap allowed only back-to-back boundary layers to exist with the exclusion of an interspersed bulk layer. A minimum tangential velocity of approximately 1.2 m per second is necessary to produce this unexpectedly perfect degree of mixing between inlet and outlet, which typically in the apparatus are spaced apart a length of about 24 inches. For example, if the annular gap was set at about 5 mm, allowing a bulk layer to exist between the laminar boundary layers, striations of the components to be mixed were starkly visible during their entire travel down the gap, in an experimental test. Taylor vortices with their segregating effect on components to be mixed can now be avoided above critical Taylor numbers that would produce such detrimental vortices, making ideal plug-flow mixing possible on a sub-Kolmogoroff scale. The annular gap surfaces can be coated with a layer of catalyst and can be made to reflect electromagnetic waves. Temperature gradients are essentially avoided in the very thin annular gaps. Sharply reduced surface fouling and scaling is leading to precision thermal control in the invention.

The invention has particular application to Bio-Reactor Systems in which adequate mixing of a microbial culture is essential for many aspects of a fermentation, including assuring an adequate supply of nutrients to the cells and removing any toxic materials from their vicinity. Mixing also affects the supply of oxygen by breaking large bubbles into smaller ones and dispersing them uniformly in the liquid so that their residence time in the reactor is increased, thereby bringing about increased gas holdup interfacial area for oxygen transfer. Accurate temperature control and efficient heat transfer also require good mixing for efficient heat transfer. Good mixing is essential to maintain a homogeneous culture in which the concentrations of specific metabolites can be accurately monitored. Mixing is also important to ensure the quick dispersion of any added solutions such as acid, base, or nutrients, so that there is no local high concentration buildup.

Mixing in bioreactors is very complex and has been the subject of considerable investigation and discussion. Certainly, the greatest need for good liquid-phase mixing and gas-liquid mass transfer is the provision of a microbial culture with an adequate amount of oxygen. However, mechanical mixing causes turbulence and eddies within the fermentation medium, approximately 50–300 $\mu$m in size. The transfer of solutes to the approximately 1–2 $\mu$m long cells inside these eddies is diffusion limited, a process that is dependent on the viscosity of the medium. As a result of these limitations, it would seem ideal to provide the culture with as much mixing as possible. However, an increase in mixing causes a concomitant increase in hydromechanical stress (usually attributed to shear), which can severely impinge on the viability of the microorganisms. This phenomenon has been termed turbohypobiosis. The Theological properties of the medium also have an effect on the mixing, because as the viscosity increases so does the power input required for the same degree of mixing; this places very real mechanical and costs constraints on the size and structure of the bio-reactor. However, for all practical purposes, these limitations do not exist for small bioreactors, so it is quite common to see small (1–2L) bioreactors where the size of the mixer motor is up 25% of the vessel size. This gives an efficiency of mixing which cannot be economically realized in larger bioreactors. Overall, for effective scale-up, it is essential to approximate the final fermentation as closely as possible at the research and pilot plant stage.

For a given bioreactor design, viscosity and power input will determine the flow patterns, which affect the reactor performance on both microscopic and macroscopic scales. Shear appears as one of the manifestations of the former, and it directly affects both heat and mass transfer. All of the transfer phenomena are finally integrated with the kinetics of the process to yield biomass growth and product formation. Large vessels do not have uniform hydrodynamic conditions in the whole of their volume, and sometimes it makes sense to define regions within them according to velocity and turbulence. Each of these regions constitutes a different environment, which may have different substrate and product concentrations, different pH, different cell concentration, different temperatures, and different shear conditions. Once this is defined, the equations representing the system can be written, because the kinetics of the reactions and the transfer rates depend on these variables.

The stirred tank fermenter is the most important type of bioreactor for industrial production processes. The agitator or agitators are required to perform a wide range of functions: adequate momentum, heat and mass transfer, and mixing as well as homogenization of suspensions. Optimization of the individual tasks would result in different design of the impellers. Because all these requirements must be accomplished at the same time, the agitators used in practice always reflect compromises. Conventional impellers used in fermentation are typically classified into axial and radial flow impellers. Of the many impeller geometries, the six-blade disk impeller with gas sparging below the impeller is most often used in the standard configuration. However, an interest in using high-flow, low-power-number agitators such as those sold under the Trade names Intermig; Lightnin A315; Prochem Maxflow T; and Scaba 6SRGT have been developed and improved performance of fermentation processes has been reported with such alternative designs. Because of the relatively low oxygen transfer efficiency of stirred tank reactors with respect to power input, a rather high specific power input is necessary for a sufficient oxygen transfer rate, which is independent of the size of the reactor. Therefore, the high degree of heat produced by the stirring in large (>500 m$^3$) stirred tank reactors is difficult or impossible to reduce in the reactor. Furthermore, at low stirrer speeds, the gas dispersion and mixing efficiency of stirrers are extremely low. Therefore, it is technically and economically inappropriate to use stirred reactors for low-performance processes (e.g., biological wastewater treatment) which are carried out in large reactors at low specific power input. In some cases, biological factors (e.g., shear sensitivity of cells) require reactors other than stirred tanks.

A few papers that have been published deal with the application of these reactors for the production of primary and secondary metabolites by bacteria (e.g., Streptomyces), yeasts, or fungi in highly viscous culture media, where the rheology of the medium varies during the productions due to the change of the medium viscosity and cell morphology. With increasing viscosity and reactor volume the nonuniformity of the medium composition in the reactors gradually becomes dominant. It is no longer possible to apply lumped parameter or axial dispersion models for the liquid phase; structured reactor models are needed. However, because of the lack of experimental data, no structured reactor models exist at present for the description of cultivation processes. in large reactors. Therefore, in this review, only lumped parameter and simple axial dispersion models can be considered. Many different types have been suggested. Mechanically mixed fermentors represent one type; they may be illuminated externally to provide light to facilitate the reaction. Alternatively, an external jacket (annulus) may be provided for heat removal with light provided via a hollow shaft or inserted finger. Several commercial bioreactors with internal illumination are available. The second type is an annular design with internal geometry that results in generation of Taylor vortices. An enhancement in photosynthesis has been noted for this type of ordered mixing compared with turbulent mixing. Hollow light-transmitting baffles provided with fluorescent tubes have been suggested for insertion into a rectangular tank. Usually, one-sided illumination is provided for rectangular tanks. Such geometry is, in fact, the easiest to treat quantitatively. A special type of annular reactor is that of Algatron (Trade name). In this reactor, a thin algal film is held against the internal wall of a rotating cylinder by centrifugal force. The light source can be located both internally and externally of the culture annulus. In addition, a falling film photobioreactor has been suggested. Algae are allowed to fall in a thin film down through a corrugated panel and are eventually recycled.

In common with the chemical process industries, the development of manufacturing processes utilizing materials of biological origin or using microbial strains to carry out bioconversions entails a number of steps. Starting at the researcher's laboratory bench in equipment of a few milliliters volume, scale-up continues to industrial scale with hundreds or thousands of cubic meters capacity. Scale-up of design between each stage is important, but generally it is only the last step to the largest unit which is critical. This is because in most cases there is economy of scale and plants would get bigger and bigger if it were not for design limitations dependent on a variety of factors, the most important being volume/surface area ratio.

The reactor of the invention provides a method to permit a widest possible variety of continuous reactions by using boundary layer film shear as the fluid dynamic principle of uniform macro- as well as micro-mixing, by eliminating eddy decay, by eliminating radial temperature gradients, by greatly facilitating scaling up or down of the system since there is all but only one basic geometry (a tubular rotor spinning inside a tubular stator) necessary and considerable power savings are possible as there is no need for re-circulating bulk volumes of liquids in tanks or to overcome the excessive drag resistance in static mixers. Precision micro-mixing combined with axially zoned temperature control, for example, greatly improves the elimination of unwanted side-reactions or allows the production of very narrow molecular weight distributions in polymerization reactions. A further unexpected characteristic of the invention is the absence of fouling at the processing surfaces. Equally easy is the cleaning of the interior of the reactor, which is accomplished by quickly purging the fine annular gap with a suitable solvent, usually requiring less than 10 seconds to complete. The flow characteristic of the invention is that of an ideally well-mixed plug-flow with minimum backmixing and no channeling.

We claim:

1. A method for processing materials, comprising:

passing materials to be processed in a flow path through an annular processing passage between two closely spaced smooth surfaces provided by respective cylindrical apparatus members at least one rotating relative to the another;

wherein the material forms material boundary layers against both the surfaces;

wherein the radial spacing between the two surfaces is equal to or less than the back-to-back radial thicknesses of the two boundary layers: and wherein the smoothnesses of the surfaces are such that formation of Taylor vortices in the processing passage is inhibited.

2. A method as claimed in claim 1, wherein the cylindrical apparatus members rotate relative to one another about respective longitudinal axes that are coaxial with one another so that the radial spacing of the two surfaces is constant circumferentially thereof.

3. A method as claimed in claim 1, wherein the apparatus members are moved so as to produce a linear velocity between their operative surfaces relative to one another of at least 1.2 meter per second.

4. A method as claimed in claim 1, wherein the smoothness of the surfaces is 10 microinches or less.

5. A method as claimed in claim 4, wherein the smoothness of the surfaces is 5 microinches or less.

6. A method as claimed in claim 1, further comprising applying processing energy to the processing passage through the wall of the outer of the two members.

7. A method as claimed in claim 6, wherein the energy applied to the processing passage is any one of electromagnetic energy of microwave frequency, light, X-rays, gamma radiation and ultrasonic longitudinal vibrations.

8. A method as claimed in claim 1, wherein one or both of the surfaces is coated with catalytic material that enhances at least one of chemical, biochemical and biocidal reactions in the processing passage.

9. An apparatus for processing materials comprising:

two cylindrical apparatus members mounted for rotation relative to one another, and defining two closely spaced smooth surfaces providing an annular processing passage constituting a flow path for the material;

wherein the radial spacing between the two surfaces is equal to or less than the back-to-back radial thicknesses of the two laminar boundary layers of the material against the two surfaces that is to pass through the processing passage; and wherein the smoothnesses of the surfaces are such that formation of Taylor vortices in the processing passage is inhibited.

10. An apparatus as claimed in claim 9, wherein the cylindrical apparatus members are mounted to rotate relative to one another about respective longitudinal axes that are coaxial so that the radial spacing of the two surfaces is constant circumferentially thereof.

11. An Apparatus as claimed in claim 9, wherein the apparatus members are moved so as to produce a linear velocity between their operative surfaces relative to one another of at least 1.2 meter per second.

12. An apparatus as claimed in claim 9, wherein the smoothness of the surfaces is 10 microinches or less.

13. An apparatus as claimed in claim 12, wherein the smoothness of the surfaces is 5 microinches or less.

14. An apparatus as claimed in claim 12, wherein the smoothnesses of the surfaces are 5 microinches or less.

15. An apparatus as claimed in claim 9, wherein the smoothnesses of the surfaces are 10 microinches or less.

16. An apparatus as claimed in claim 9 wherein the apparatus members are coaxially mounted and at least one rotates relative to the other.

17. An apparatus as claimed in claim 9, further comprising means for applying processing energy to the processing passage through the wall of the outer of the two members.

18. An apparatus as claimed in claim 17, wherein the energy applied to the processing passage is any one of electromagnetic energy of microwave frequency, light, X-rays, gamma radiation and ultrasonic longitudinal vibrations.

19. An apparatus as claimed in claim 9, wherein one or both of the surfaces is coated with catalytic material that enhances at least one of chemical, bio-chemical and biocidal reactions in the processing passage.

* * * * *

UNITED STATES PATENT AND TRADEMARK OFFICE
CERTIFICATE OF CORRECTION

PATENT NO. : 6,471,392 B1
DATED : October 29, 2002
INVENTOR(S) : Richard A. Holl It is certified that error appears in the above-identified patent and that said Letters Patent is hereby corrected as shown below:

Column 1,
Line 35, replace "5,430,891" with -- 5,340,891 --.

Signed and Sealed this

Thirteenth Day of July, 2004

JON W. DUDAS
*Acting Director of the United States Patent and Trademark Office*